United States Patent
Brown

[11] Patent Number: 6,112,609
[45] Date of Patent: Sep. 5, 2000

[54] GEAR ARRANGEMENT

[76] Inventor: Gary Henry Brown, 8 Kelverley Grove, West Bromwich, West Midlands, B71 3QL, United Kingdom

[21] Appl. No.: 09/218,742

[22] Filed: Dec. 22, 1998

[30] Foreign Application Priority Data

Dec. 24, 1997 [GB] United Kingdom .................. 9727145

[51] Int. Cl.[7] ...................................... F16H 3/30
[52] U.S. Cl. ................. 74/351; 74/462; 280/260
[58] Field of Search .................. 74/412 R, 416, 74/395, 396, 400, 462, 347, 351; 280/260

[56] References Cited

U.S. PATENT DOCUMENTS

| | | | |
|---|---|---|---|
| 649,878 | 5/1900 | Scharbach | 74/351 |
| 2,141,627 | 12/1938 | Street | 74/462 |
| 2,378,634 | 6/1945 | Hussey | 280/260 |
| 3,863,503 | 2/1975 | Loeb et al. | 74/347 |
| 4,447,068 | 5/1984 | Brooks | 74/351 |
| 5,228,354 | 7/1993 | Oosterwal et al. | 74/347 |
| 5,342,075 | 8/1994 | Williams | 74/347 |
| 5,496,049 | 3/1996 | Escobedo | 74/351 |
| 5,622,081 | 4/1997 | Clements | 74/351 |

FOREIGN PATENT DOCUMENTS 0227152  1/1987  European Pat. Off. .

*Primary Examiner*—Sherry L. Estremsky
*Attorney, Agent, or Firm*—Watts, Hoffmann, Fisher & Heinke Co. LPA

[57] ABSTRACT

A gear arrangement 10 which comprises a first disc member 12 rotatable about a first axis 14 and carrying rings 16 of teeth 18, the rings 16 being centered on the axis 14 and at respective distances therefrom. A second member 20 is rotatable about a second axis 22 and carries further teeth 24. The second member can move toward and away from the first axis 14. The teeth 18, 24 are so formed as to allow the second teeth 24 to mesh in driving manner with each ring of teeth 18 as the second member 20 moves toward and away from the first axis 14. In this way, the transmission ratio of the gear arrangement can be changed.

27 Claims, 3 Drawing Sheets

GEAR ARRANGEMENT

BACKGROUND OF THE INVENTION

The present invention relates to gear arrangements.

There are many applications in which gear arrangements are required for the transmission of mechanical work. In many situations, it is desirable for the gear arrangement to provide an adjustable transmission ratio. It is also commonly required to provide mechanically simple and robust arrangements, in the interests of cost, reliability and weight considerations.

SUMMARY OF THE INVENTION

The present invention provides a gear arrangement comprising a first member rotatable about a first axis and carrying at least two rings of teeth centred on the axis, and at respective distances therefrom, a second member rotatable about a second axis and carrying further teeth, the second member being movable toward and away from the first axis, and the ring teeth and second teeth being so formed as to allow the second teeth to mesh in driving manner with each ring of teeth as the second member moves toward and away from the first axis.

Preferably the first member comprises a disc rotatable about the first axis and carrying the rings of teeth on one face.

The first and second axes are preferably perpendicular.

The rings of teeth are preferably separated radially by at least the axial length of the second teeth, whereby the second teeth may move to a position between adjacent rings and at which position the second teeth are not meshed with either adjacent ring.

Each tooth preferably has a first face facing the first axis and having a datum level at which the corresponding ring of teeth has the tooth thickness, pitch and pressure angle of the second member. Each tooth preferably tapers from the first face. Each tooth preferably has a tapered exposed face which meets the first face at the widest edge of the exposed face, and which extends away from the first axis toward the narrowest edge of the exposed face. The exposed face is preferably perpendicular to the first axis and the exposed face is preferably spaced from the datum level in a direction parallel to the first axis by a distance substantially equal to the tooth thickness of the first face.

Each tooth preferably has a tapered base which meets the first face at the narrowest edge of the base, and which extends away from the first axis toward the widest edge of the base. The base is preferably substantially perpendicular to the first axis and may be spaced from the datum level parallel to the first axis by a distance substantially equal to the tooth thickness of the first face.

The taper angle of the or each taper is preferably equal to 360°/n, where n is the number of teeth in the ring.

Each tooth preferably further comprises side faces bounded by the first face, the exposed face, the base and a rear face spaced from the first face by the radial length of the exposed face and the base. Each side face is preferably planar.

Preferably each tooth is so located that the central point of the first face at the datum level lies on a circle centred on the first axis and having a length equal to the pitch multiplied by the total number of teeth in the ring. The first face of each tooth is preferably tangential to the circle along the datum level. The first face is preferably planar and may be substantially parallel to the first axis.

Preferably the second member is carried by splines on a third rotatable member, to allow the second member to move along the third member as the second member comes into and out of mesh with the rings of teeth. Preferably resilient means urge the second member to move in a preferred direction relative to the first axis, and there may be control means operable to pull the second member against the bias of the resilient means.

The invention also provides a bicycle comprising pedals and a transmission arrangement for transmitting drive from the pedals to a road wheel, the transmission comprising at least one gear arrangement as aforesaid.

Preferably the transmission comprises first and second transmission arrangements as aforesaid, the first arrangement being driven by the pedals and driving a drive shaft, the second arrangement being driven by the drive shaft and driving the road wheel. The pedals preferably drive the first member of the first arrangement and the drive shaft preferably drives the second member of the second arrangement.

BRIEF DESCRIPTION OF THE DRAWINGS

An embodiment of the present invention will now be described in more detail, by way of example only, and with reference to the accompanying drawings, in which.

DETAILED DESCRIPTION OF THE INVENTION

Figure 1:
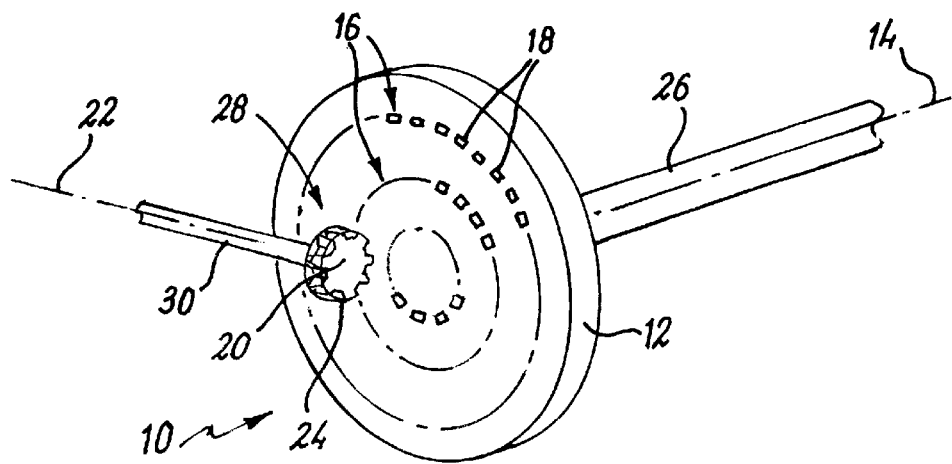
FIG. 1 is a simplified, schematic and perspective view of a gear arrangement according to the present invention.

FIG. 1 shows a gear arrangement 10 which comprises a first disc member 12 rotatable about a first axis 14 and carrying rings 16 of teeth 18, the rings 16 being centred on the axis 14 and at respective distances therefrom. A second member 20 is rotatable about a second axis 22 and carries further teeth 24. The second member can move toward and away from the first axis 14 by means to be described below. The teeth 18, 24 are so formed as to allow the second teeth 24 to mesh in driving manner with each ring of teeth 18 as the second member 20 moves toward and away from the first axis 14. In this way, the transmission ratio of the gear arrangement can be changed.

In more detail, the disc 12 is perpendicular to the axis 14 and carried by a shaft 26, centred on and rotatable about the axis 14. The shaft 26 can thus be used to drive or be driven by the gear arrangement 10.

The exposed face of the disc 12 carries three concentric rings 16, each centred on the axis 14 and of respective radius. It is to be understood that two, three or more rings 16 could be used. It can be seen from FIG. 1 that there is a gap between adjacent rings 16. That is, an annulus of the disc face is exposed between rings 16. This provides a location at which the second member 20 may be placed to be out of engagement with any ring 16 and to ensure that the second member 20 has unmeshed from one ring 16 before becoming meshed with a neighbouring ring.

The second member 20 includes a spur wheel 28 carrying the teeth 24 in a ring centred on the second axis 22. The wheel 28 is connected to a second shaft 30 in order to drive the shaft 30, or be driven by it. The shaft 30 is centred on the second axis 22. The axial length of the teeth 24 along the axis 22 is less than the radial separation of tooth rings 16 provided by the gap between them, to ensure that the wheel 28 can sit with the teeth 24 between adjacent rings 16 and not meshed with either ring.

The rings 16 have a greater number of teeth 18 as their radius increases. Consequently, as the wheel 28 moves in and out relative to the axis 14, to mesh with different rings 16, the effective ratio between the shafts 26 and 30 will change.

Figure 2:
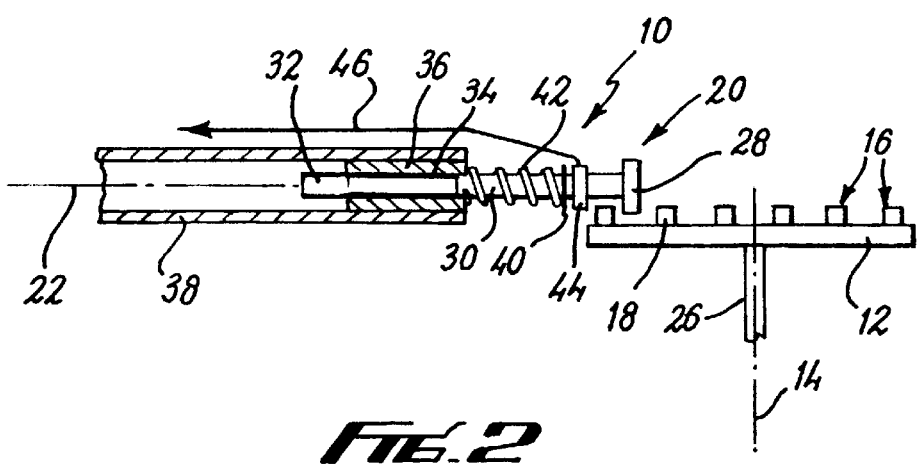
FIG. 2 is a schematic plan view of a gear arrangement according to the present invention.

FIG. 2 illustrates schematically how such movement is achieved. The shaft 30 has a terminal end 32 which is externally splined and located in an internally splined passage 34 in a bush 36. The bush 36 plugs the end of a tubular shaft 38 centred on and rotatable about the axis 22.

The splines allow the shaft 30 to slide axially, relative to the shaft 38, while retaining the shafts 30, 38 engaged to rotate together.

The shaft 30 carries a flange 40 and a compression spring 42 acts between the flange 40 and bush 36 to urge the shaft 30 toward the axis 14. The shaft 30 also carries a thrust race 44 controlled by a gear cable 46 so that pulling on the gear cable 46 will move the shaft 30 away from the axis 14, and releasing the gear cable 46 will allow the spring 42 to push the shaft 30 toward the axis 14.

FIG. 2 illustrates the position in which the wheel 28 is located in a gap between adjacent rings 16 or teeth 18, and so is not meshed with any ring 16.

It can also be appreciated from FIG. 2 that the design of teeth 18 must allow the wheel 28 to come into mesh when moving in either direction toward or away from the axis 14.

Figure 3:
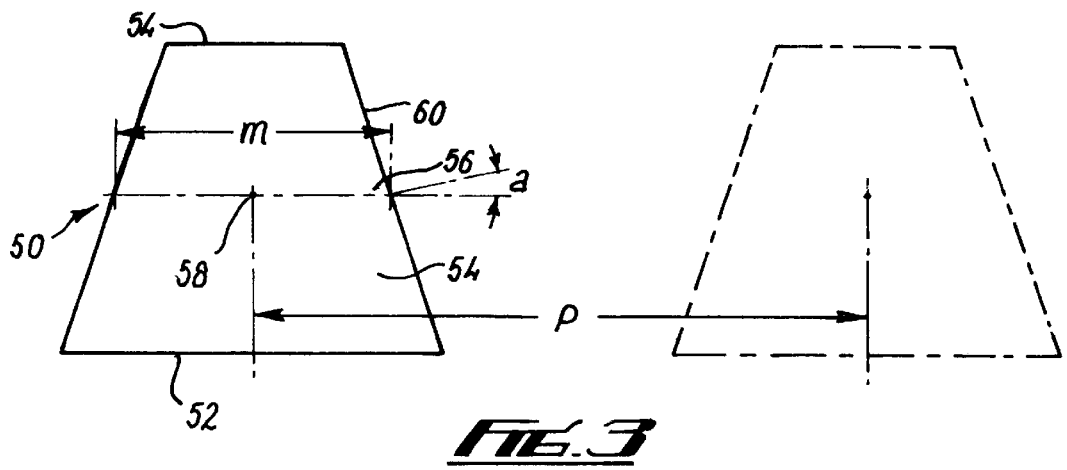
FIG. 3 is an elevation of the front face of a tooth from the gear arrangement.

The teeth 24 are designed to form a conventional spur wheel having teeth with a tooth thickness, pitch and pressure angle designed according to conventional calculations. FIG. 3 illustrates the meaning of the terms "tooth thickness", "pitch" and "pressure angle". A tooth 50 has a base 52 and tapers to an exposed face 54. The width m of the tooth 50 at the mid-height (i.e. at a datum line 56, parallel to the base 52 and passing through the centre point 58 of the tooth face) is called the "tooth thickness". The separation p of centre points of adjacent teeth 50 is called the "pitch". The "pressure angle" a is the angle between the datum line 56 and a line drawn perpendicular to the taper face 60 of the tooth 50.

Figure 4:
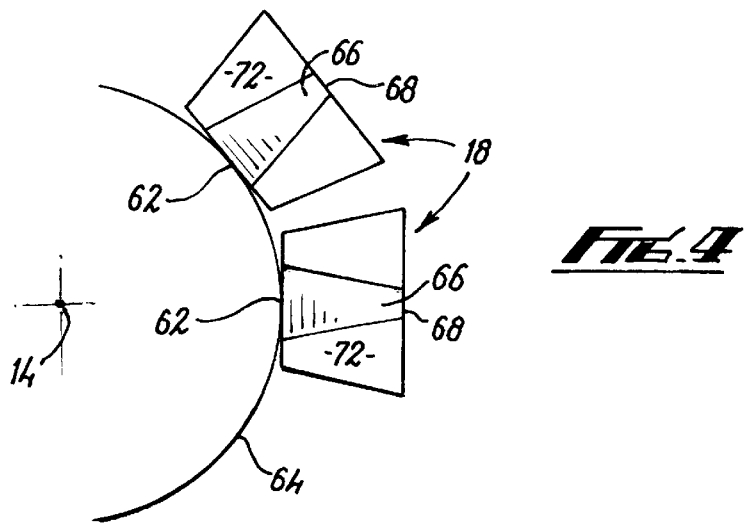
FIG. 4 is a schematic elevation of the gear disc showing two teeth.
Figure 5:
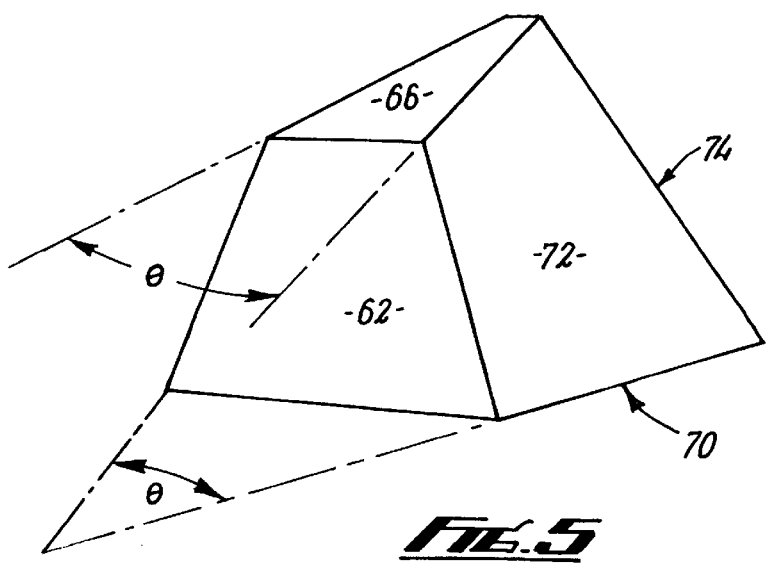
FIG. 5 is a schematic perspective view of one tooth.

FIGS. 4 and 5 show the design of teeth 18. Each tooth 18 has a first face 62 which faces the axis 14 and which, when viewed from the first axis 14 has the shape illustrated in FIG. 3. The teeth 18 are arrayed around an imaginary circle 64 with each planar face 62 tangential to the circle 64 and meeting the circle 64 at the centre point 58 of the face 62. The faces 62 of the teeth 18 are based on the conventional spur gear design explained in relation to FIG. 3, having the same tooth thickness, pressure angle and pitch as the wheel 28. However, the pitch is now measured around the circumference of the circle 64, which has a total length equal to the product of the pitch and the number of teeth.

Behind the face 62 (that is, further away from the axis 14) each tooth tapers. The exposed face 66 at the top of the tooth 18 meets the face 62 at the widest edge of the face 66 and extends away from the axis 14 towards the narrowest edge 68, furthest from the axis 14. The top face 66 is perpendicular to the first axis and is spaced from the datum level 56 (in a direction parallel to the axis 14) by a distance substantially equal to the tooth thickness m. The face 66 tapers at an angle $\theta$ as indicated in FIG. 5.

The tooth 18 also has a base at 70, also tapered. The base 70 is not exposed, because it is at the boundary between the tooth 18 and the disc 12 (not shown in FIG. 4). The base is narrowest at its edge which meets the first face 62, and extends away from the first axis 14 toward the widest edge of the base 70, furthest from the axis 14. By virtue of abutment with the disc 12, the base 70 is perpendicular to the first axis. The base 70 is spaced from the datum line 56 (in a direction parallel to the first axis 14) by a distance substantially equal to the tooth thickness m.

It can thus be seen from FIG. 5, that the face 66 and base 70 taper in opposite senses, i.e. the face 66 narrows away from the axis 14, whereas the base 70 widens away from the axis 14.

However, in each case, the taper angle $\theta$ is the same and is chosen to be substantially equal to 360° divided by n, where n is the number of teeth in the ring.

Each tooth 18 also has side faces 72 bounded by the first face 62, top face 66, base 70 and a rear face 74. These side faces 72 have a complicated geometry. At any point along them, they are straight from the disc to their upper edge (at a plane parallel with the axis 14) but the angle of that line steadily decreases away from the face 62, by virtue of the tapers just described.

It has been found by experiment that by designing teeth substantially as described above, the spur wheel 28 is able to move radially toward and away from the first axis 14 and mesh with and unmesh from the rings 16 when moving in either direction.

Figure 6:
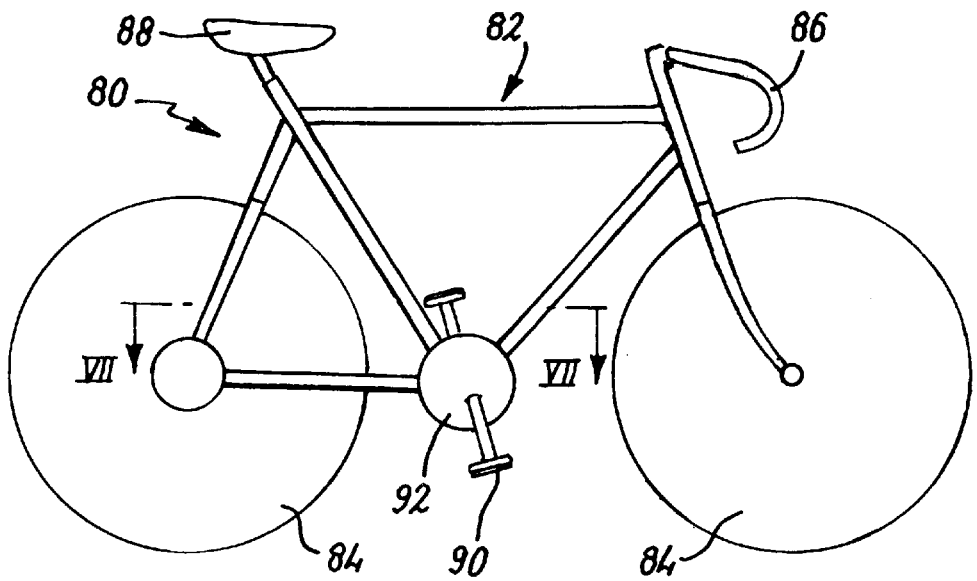
FIG. 6 is an elevation showing a bicycle incorporating gear arrangements according to the present invention.
Figure 7:
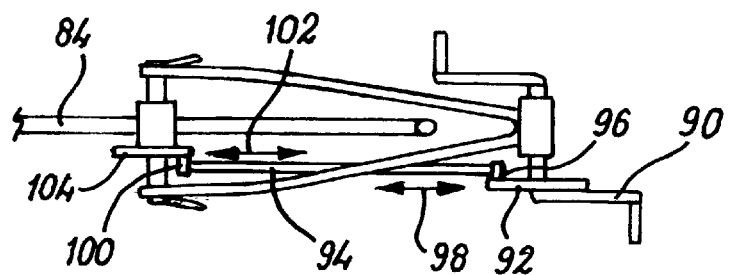
FIG. 7 is a partial sectional plan view along the line VII—VII of FIG. 6.

It will be apparent that the gear arrangement described above can be used in many different situations. One example of an application is illustrated in FIGS. 6 and 7. FIG. 6 shows a bicycle 80 having a frame 82 carrying front and rear wheels 84, handle bars 86 and a saddle 88. Pedals 90 are used by the rider to turn a disc 92 supported on the frame 82 in the manner in which, and at the position at which a conventional front chain wheel of a conventional bicycle would normally be. However, it is apparent from FIG. 6 that the bicycle 80 does not include a chain between the pedals and rear wheel. Instead, two gear arrangements of the type described in relation to FIGS. 1 to 5 are used as shown in FIG. 7, to allow a chainless transmission from the pedals to the wheel. In using the pedals 90, the rider causes the disc 92 to turn. The disc 92 corresponds to the disc 12 in a first gear arrangement as shown in FIG. 1 and which drives a transmission shaft 94 through a spur wheel 96, as described above. Appropriate gear cables are used (as described in relation to FIG. 2 but not shown in FIG. 7) to move the spur wheel 96 in either direction as illustrated by the arrow 98, to allow the ratio of the first gear arrangement to change.

The shaft 94 extends straight to the central region of the rear wheel 84, where a second gear arrangement according to the invention is provided. In this case, the disc of the gear arrangement is carried by the wheel 84 and driven by a further spur wheel 100, which is in turn driven by the shaft 94. The wheel 100 can move as described in FIG. 2 in either direction illustrated by the arrow 102, to allow the ratio of the second gear arrangement to be changed.

Consequently, by providing several rings of teeth on the pedal disc 92 and on the wheel disc 104, the rider is provided with a large range of different transmission ratios, each individually selectable by appropriate setting of the positions of the wheels 96,100.

EXAMPLE 1

In one example, a bicycle transmission arrangement has a front disc with rings of 70, 60 and 50 teeth, and a rear disc with rings of 20, 28, 36, 44 and 52 teeth. This gives various possible transmission ratios. The number of turns of the rear disc, for each turn of the front disc, will then be:

|  | Rear Disc | | | | |
| --- | --- | --- | --- | --- | --- |
| Front Disc | 20 | 28 | 36 | 44 | 52 |
| 70 | 3.5 | 2.5 | 1.944 | 1.591 | 1.346 |
| 60 | 3 | 2.143 | 1.667 | 1.364 | 1.154 |
| 50 | 2.5 | 1.786 | 1.386 | 1.136 | 0.962 |

The detailed dimensions of the teeth for the 60 tooth and 36 tooth rings would be:

| N | T | a | a' | B | b' | L | l' | f | θ° | p° |
| --- | --- | --- | --- | --- | --- | --- | --- | --- | --- | --- |
| 60 | 3.5 | 2.0 | 2.0 | 4.956 | 5.376 | 2.044 | 1.625 | 4.0 | 6.0 | 20 |
| 36 | 3.5 | 2.0 | 2.0 | 4.956 | 5.656 | 2.044 | 1.344 | 4.0 | 10.0 | 20 | where
N = number of teeth
T = tooth thickness at datum level 56
a = distance from datum level 56 to top face 66
a' = distance from datum level 56 to base 52
B = width of tooth at base 32 of front face 62
b' = width of tooth at base 52 of rear face 74
L = width of tooth at top face 66 and at front face 62
l' = width of tooth at top face 66 and at rear face 74
f = length of tooth from front face 62 to rear face 74
θ = modification angle (in degrees)
p = pressure angle (in degrees)

It is envisaged that this application in a bicycle is a particularly advantageous application of the gear arrangement of the invention, in replacing the chain of a conventional bicycle, and thus eliminating problems associated with oil rubbing off on clothing, mechanical failure due to poor maintenance of the chain, and the like. It is envisaged that a gear arrangement according to the present invention can be manufactured to be robust, strong and substantially maintenance free, thereby providing reliable service for an extended period.

It is envisaged that the various components, particularly the disc 12 and teeth 18 can be manufactured in a wide variety of technologies, such as casting from metal, or moulding from a suitably strong alternative material (such as a reinforced resin or plastics material, or the like). The terms "tooth" and "teeth" are used to encompass any equivalent meshing arrangement, whether concave, convex, recessed or proud.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A gear arrangement comprising a first member rotatable about a first axis and carrying at least two rings of teeth centered on the axis, and at respective distances therefrom, a second member rotatable about a second axis and carrying further teeth, the second member being movable toward and away from the first axis, the ring teeth and second member teeth being so formed as to allow the second member teeth to mesh in driving manner with each ring of teeth as the second member moves toward and away form the first axis, each ring tooth having a first face facing the first axis and having a datum level at which the corresponding ring of teeth has the tooth thickness, pitch and pressure angle of the second member teeth, and, each ring tooth being so located that the central point of the first face at the datum level lies on a circle centered on the first axis and having a circumferential length equal to the pitch multiplied by the total number of teeth in the ring.

2. An arrangement according to claim 1, in which the first member comprises a disc rotatable about the first axis and carrying the rings of teeth on one face.

3. An arrangement according to claim 1, in which the first and second axes are perpendicular.

4. An arrangement according to claim 1, in which the rings of teeth are separated radially by at least the axial length of the second member teeth, whereby the second member teeth may move to a position between adjacent rings and at which position the second member teeth are not meshed with either adjacent ring.

5. An arrangement according to claim 1, in which the first face of each ring tooth is tangential to the circle along the datum level.

6. An arrangement according to claim 1, in which the second member is carried by splines on a third rotatable member, to allow the second member to move along the third member as the second member teeth come into and out of mesh with the rings of teeth.

7. A bicycle comprising pedals and a transmission arrangement for transmitting drive from the pedals to a road wheel, the transmission comprising at least one gear arrangement according to claim 1.

8. An arrangement according to claim 1, in which each ring tooth tapers from the first face.

9. An arrangement according to any of claim 8, in which the taper angle of each taper is equal to 360°/n, where n is the number of teeth in the ring.

10. An arrangement according to claim 1, in which the first face is planar.

11. An arrangement according to claim 10, in which the first face is substantially parallel to the first axis.

12. An arrangement according to claim 1, in which each ring tooth has a tapered exposed face which meets the first face at the widest edge of the exposed face, and which extends away from the first axis toward the narrowest edge of the exposed face.

13. An arrangement according to claim 12, in which the exposed face is perpendicular to the first axis.

14. An arrangement according to claim 12, in which the exposed face is spaced from the datum level in a direction parallel to the first axis by a distance substantially equal to the tooth thickness of the first face.

15. An arrangement according to claim 1, in which each ring tooth has a tapered base which meets the first face at the narrowest edge of the base, and which extends away from the first axis toward the widest edge of the base.

16. An arrangement according to claim 15, in which the base is substantially perpendicular to the first axis.

17. An arrangement according to claim 15, in which the base is spaced from the datum level parallel to the first axis by a distance substantially equal to the tooth thickness of the first face.

18. An arrangement according to claim 15, in which each ring tooth further comprises side faces bounded by the first face, an exposed face, the base and a rear face spaced from the first face by the radial length of the exposed face and the base.

19. An arrangement according to claim 18, in which each rear face is planar.

20. An arrangement according to claim 1, in which resilient means urge the second member to move in a preferred direction relative to the first axis.

21. An arrangement according to claim 20, in which there are control means operable to pull the second member against the bias of the resilient means.

22. A gear arrangement comprising a first member rotatable about a first axis and carrying at least two rings of teeth centered on the axis, and at respective distances therefrom, a second member rotatable about a second axis and carrying further teeth, the second member being movable toward and away from the first axis, and the ring teeth and second member teeth being so formed as to allow the second member teeth to mesh in driving manner with each ring of teeth as the second member moves toward and away from the first axis, each ring tooth having a first face facing the first axis and having a datum level at which the corresponding ring of teeth has the tooth thickness, pitch and pressure angle of the second member teeth, each ring tooth having a tapered exposed face which meets the first face at the widest edge of the exposed face, and which extends away from the first axis toward the narrowest edge of the exposed face, the exposed face being spaced from the datum level in a direction parallel to the first axis by a distance substantially equal to the tooth thickness of the first face, each ring tooth having a tapered base which meets the first face at the narrowest edge of the base, the base extending away from the first axis toward the widest edge of the base, and the base being spaced from the datum level parallel to the first axis by a distance substantially equal to the tooth thickness of the first face.

23. An arrangement according to claim 22, in which the first member comprises a disc rotatable about the first axis and carrying the rings of teeth on one face.

24. An arrangement according to claim 22, in which the first and second axes are perpendicular.

25. An arrangement according to claim 22, in which the rings of teeth are separated radially by at least the axial length of the second teeth, whereby the second teeth may move to a position between adjacent rings and at which position the second teeth are not meshed with either adjacent ring.

26. An arrangement according to claim 22, in which each ring tooth tapers from the first face.

27. A gear arrangement comprising a first member rotatable about a first axis and carrying at least two rings of teeth centered on the axis, and at respective distances therefrom, a second member rotatable about a second axis and carrying further teeth, the second member being movable toward and away from the first axis, and the ring teeth and second member teeth being so formed as to allow the second member teeth to mesh in driving manner with each ring of teeth as the second member moves toward and away from the first axis, each ring tooth having a first face facing the first axis and having a datum level at which the corresponding ring of teeth has the tooth thickness, pitch and pressure angle of the second member teeth, each ring tooth having a tapered exposed face which meets the first face at the widest edge of the exposed face and extends away from the first axis toward the narrowest edge of the exposed face, each ring tooth having a tapered base which meets the first face at the narrowest edge of the base, and which extends away from the first axis toward the widest edge of the base, the taper angle of each taper being equal to $360°/n$, where n is the number of teeth in the ring.

* * * * *